Nov. 6, 1923.                     1,473,058
C. M. STEWARD
REMOVABLE TRACTOR SPUR OR LUG
Filed Nov. 21, 1921
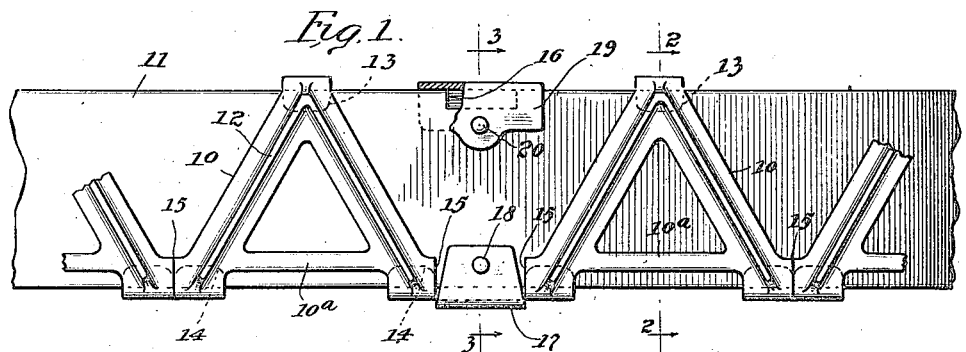
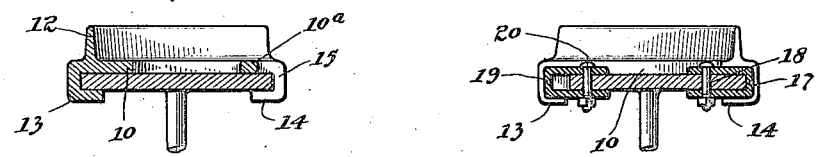
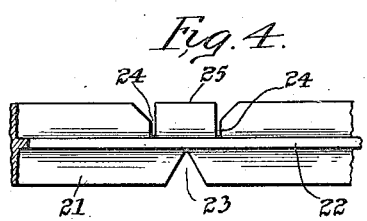
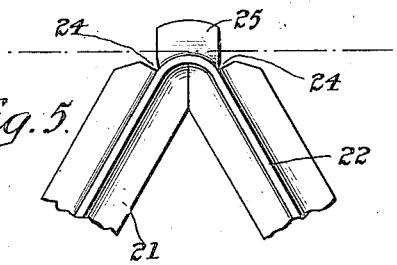
Inventor:
Charles Marsh Steward
By Benjamin, Rorehaus & Lund
Attys.

Patented Nov. 6, 1923.

1,473,058

UNITED STATES PATENT OFFICE.

CHARLES MARSH STEWARD, OF PLANO, ILLINOIS.

REMOVABLE TRACTOR SPUR OR LUG.

Application filed November 21, 1921. Serial No. 516,708.

*To all whom it may concern:*

Be it known that I, CHARLES MARSH STEWARD, a citizen of the United States, residing at Plano, in the county of Kendall and State of Illinois, have invented a new and useful Improvement in Removable Tractor Spurs or Lugs, of which the following is a specification.

My invention relates to removable spurs or lugs for use upon the rims or fellies of tractor wheels, and more particularly to a device of this character that may be readily applied to or taken off the rim for the purpose of permitting the flat rim to be used upon roadways without damaging the latter.

One of the divers objects of my invention is the provision of a spur or lug that may be readily and quickly applied to the tractor wheel and may be easily removed therefrom and stored in a comparatively small space. Another object resides in the provision of spurs or lugs, a plurality of which are arranged in abutting fashion around the wheel rim, and by a simple wedge or clamping device will be self-retaining and at the same time provide a continuous circumferential tread outside the rim of the wheel. In this connection, I have provided a spur that is so constructed that one pattern will be available for all the spurs on the wheel, thus materially lowering the expense of manufacture and permitting the devices being sold at a moderate price. Other objects comprise the provision of a sectional tread made up of one-piece spurs or lugs that are readily and easily constructed, preferably integrally of cast malleable metal or rolled metal, that are quickly assembled, economical to manufacture, and which are effective in performing their divers functions. I prefer to carry out my invention in substantially the manner hereinafter described, and as illustrated in the accompanying drawings that form a part hereof.

In the drawings:

Figure 1 is a plan of a plurality of spurs or lugs made in accordance with my invention and showing their relative positions upon the rim of a tractor wheel.

Figure 2 is a transverse sectional view on line 2—2, Fig. 1.

Figure 3 is a similar view on line 3—3, Fig. 1.

Figure 4 is a plan of a blank for forming a spur from rolled metal or T-section.

Figure 5 is a plan of the type shown in Fig. 4 after being bent and formed into a spur.

Referring to the drawings, it will be observed my improved spur or lug preferably comprises a metal piece or casting, shown in detail in Figures 1, 2 and 3, which is of substantially V-shape in outline, each arm of the V comprising an elongated base 10 that rests upon the surface of the wheel rim 11, and extending centrally and longitudinally of each base is an upstanding rib or flange 12. At the apex of the V-shaped casting and at the outer ends of each arm thereof are depending substantially L-shaped extensions 13 and 14, respectively, extending over the edge of wheel rim 11 and upon the opposite or inner surface thereof. At the ends of the arms of the casting where extensions 14 are formed the casting is provided with vertical flat faces 15 so that the said faces of adjacent spurs will abut each other when mounted upon the rim of the wheel, and for the purpose of reinforcing the structure against lateral strain or stress, I prefer to connect the outer portions of the arms of the V-shaped element by a bar or strut 10$^a$.

In order to quickly mount or assemble the spurs or lugs with the wheel rim, I have provided the latter with a recess or cut-away portion 16 in one of its edges that is of proper dimensions to permit the L-shaped extension 13 to be passed through the recess after the opposite extensions 14 have been hooked or engaged with the opposite edge of the wheel rim, after which each spur is slid or moved along on the wheel rim so that their faces 15 abut and all the spurs have been mounted upon the wheel. As seen in Figure 1, there remains a space between the ends of the two adjacent lugs or spurs, and after the same have been moved away from each other as far as possible a wedge piece 17 is driven between their adjacent faces 15, and I secure the wedge in place by a bolt 18 that passes through apertures, piece 17 and the rim where it is engaged by a nut to retain it in position. If desired, wedge piece 17 may be U-shaped in section, as illustrated in Figure 3, so that it extends upon the opposite surfaces of the rim and has the bolt 18 passed entirely through the wedge upon both sides of the rim. In order to prevent damaging the portion of the rim adjacent recess 16, I provide a suitable shield 19 of U-section that fits over the edge of the wheel rim at the location of the recess so as to cover the same, similar to the manner of mounting the wedge and is secured in place by a bolt 20 that passes through the shield and the wheel rim and has a nut-screw thereon.

Thus, it will be seen that I have provided a lug or spur structure for the wheels of tractors that is easily and quickly mounted upon or removed from the rim of the wheel; which are secured in position by a single locking device after a plurality of lugs have been placed in position; and which requires no other tools than a wrench to secure in position, or release the same for the purpose of removal. Of course, other designs of lugs may be used as I have illustrated in Figures 4 and 5. In Figures 4 and 5 a length of angle metal of T-section is employed, the web 21 upon one side of the rib or flange 22 being notched, at 23, and having spaced transverse slots 24 made in its opposite side. This blank is then bent transversely (bull dogged) to bring the edges of notch 23 together, as in Figure 5, which will cause the web to separate at slots 24, thereby providing an outwardly extended member 25 between the locations of the slots, and which is adapted to be bent down and then under to provide the L-shaped extension to engage the edge of the wheel rim. Any suitable means may be employed at the opposite spaced ends of the arms of this structure for the purpose of engaging the opposite edge of the rim.

What I claim is:

1. The combination with a tractor wheel having a rim provided with a recess in one edge, of a spur consisting of a member extended across the outer surface of said rim, and extensions on the ends of said member engaged with the edges and opposite surface of the rim; one of said extensions being inserted through said recess in assembling the spur with the rim.

2. The combination with a tractor wheel having a rim provided with a recess in one edge, of a removable spur consisting of an element having diverging arms, hooked extensions upon the spaced ends of said element engageable with the non-recessed edge of said rim, and a hooked extension upon the opposite end of said element that is inserted through said recess and engages the adjacent edge of said rim.

3. A removable tractor spur comprising a substantially V-shaped base having upstanding ribs upon its arms, substantially L-shaped depending extensions at the apex and at the ends of said arms, and a reinforcing strut connecting the outer portions of said arms.

4. A spur structure for tractor wheels comprising a plurality of substantially V-shaped elements extended across the rim of the wheel and interengaged with the edges thereof, whereby said elements are loosely mounted upon said rim; said elements arranged with the outer portions of their arms in juxtaposition with each other, and a spacer coacting with the wheel rim and interposed between adjacent portions of a pair of said elements whereby the latter are retained in place against excessive circumferential movement upon said rim.

5. The combination with a wheel rim having a recess in one edge, of a tractor spur the ends thereof having L-shaped depending extensions coacting with opposite edges of said rim whereby when said spur is moved to the location of said recess the same may be removed by passing one of said extensions through said recess.

Signed at Chicago, county of Cook, and State of Illinois, this 16th day of November, 1921.

CHARLES MARSH STEWARD.